(12) United States Patent
Ball et al.

(10) Patent No.: US 9,533,180 B2
(45) Date of Patent: *Jan. 3, 2017

(54) HYDRANT ENCLOSURE WITH INTEGRAL FAUCET

(71) Applicant: WCM Industries, Inc., Colorado Springs, CO (US)

(72) Inventors: William T. Ball, Colorado Springs, CO (US); Eric Pilarczyk, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 166 days.

This patent is subject to a terminal disclaimer.

(21) Appl. No.: 14/317,627

(22) Filed: Jun. 27, 2014

(65) Prior Publication Data

US 2015/0000767 A1    Jan. 1, 2015

Related U.S. Application Data

(60) Provisional application No. 61/841,597, filed on Jul. 1, 2013.

(51) Int. Cl.
| | | |
|---|---|---|
| *A62C 35/20* | (2006.01) | |
| *E03B 7/09* | (2006.01) | |
| *E03B 9/02* | (2006.01) | |
| *E03B 9/10* | (2006.01) | |
| *F16K 27/00* | (2006.01) | |

(52) U.S. Cl.
CPC .............. *A62C 35/20* (2013.01); *E03B 7/095* (2013.01); *E03B 9/025* (2013.01); *E03B 9/10* (2013.01); *F16K 27/006* (2013.01); *Y10T 137/7043* (2015.04); *Y10T 137/7062* (2015.04)

(58) Field of Classification Search
CPC .......... A62C 35/20; F16K 27/006; E03B 9/10; E03B 9/025; E03B 7/095
USPC ....... 137/360, 377, 382, 382.5; 220/3.3, 3.5, 220/3.8
See application file for complete search history.

(56) References Cited

U.S. PATENT DOCUMENTS

| | | | |
|---|---|---|---|
| D180,010 S | 4/1957 | Britton | |
| D216,791 S | 3/1970 | Woodford | |
| D228,554 S | 10/1973 | Magorien | |
| 3,952,770 A * | 4/1976 | Botnick | ................ E03B 9/025 137/218 |
| D245,255 S | 8/1977 | Porter | |
| D275,616 S | 9/1984 | Gray | |
| D283,204 S | 4/1986 | McDonald | |
| D285,824 S | 9/1986 | Anderson | |
| D318,718 S | 7/1991 | Blatt | |
| 5,964,246 A | 10/1999 | Meeker | |

(Continued)

OTHER PUBLICATIONS

U.S. Appl. No. 29/529,465, filed Jun. 8, 2015, Ball et al.

(Continued)

*Primary Examiner* — Kevin Murphy
*Assistant Examiner* — Nicole Wentlandt
(74) *Attorney, Agent, or Firm* — Sheridan Ross P.C.

(57) ABSTRACT

Provided is an enclosure with an integrated hydrant. The enclosure includes a fluid flow conduit that transfers fluid from a fluid supply tube to a fluid outlet, which may be associated with the backflow preventer. The enclosure has a conduit that carries water from the fluid supply tube to the backflow preventer. Thus, a lower profile, lighter, and more aesthetically pleasing enclosure is provided.

18 Claims, 17 Drawing Sheets

(56) References Cited

U.S. PATENT DOCUMENTS

| | | | |
|---|---|---|---|
| 6,752,167 B1* | 6/2004 | Stanaland | E03B 7/10 137/218 |
| 6,948,512 B2 | 9/2005 | McKeague | |
| D578,209 S | 10/2008 | Schurg et al. | |
| D612,465 S | 3/2010 | Salser et al. | |
| D614,736 S | 4/2010 | Freiler | |
| 8,042,565 B2 | 10/2011 | Ball et al. | |
| D656,223 S | 3/2012 | Cronje et al. | |
| 8,353,309 B1 | 1/2013 | Embry et al. | |
| D675,714 S | 2/2013 | Nguyen | |
| D676,527 S | 2/2013 | Xue et al. | |
| D680,621 S | 4/2013 | Foster | |
| D681,782 S | 5/2013 | Bohm et al. | |
| D681,784 S | 5/2013 | Liljegren et al. | |
| D685,906 S | 7/2013 | Dale et al. | |
| D702,320 S | 4/2014 | Pifer | |
| D708,303 S | 7/2014 | Gehrling | |
| D711,510 S | 8/2014 | Halldorsson | |
| D715,405 S | 10/2014 | McAlpine | |
| D717,404 S | 11/2014 | Bailey et al. | |
| D720,046 S | 12/2014 | Morodomi et al. | |
| D721,787 S | 1/2015 | Yoshimura et al. | |
| D721,788 S | 1/2015 | Pifer | |
| D722,674 S | 2/2015 | Lipkens et al. | |
| D722,676 S | 2/2015 | Gaertner | |
| 8,973,599 B2 | 3/2015 | Stanaland | |
| D728,748 S | 5/2015 | Gehrling | |
| 2004/0000337 A1 | 1/2004 | Cooper | |
| 2006/0086921 A1 | 4/2006 | Ball | |
| 2011/0062834 A1 | 3/2011 | Ball et al. | |
| 2014/0202558 A1 | 7/2014 | Chou et al. | |
| 2014/0305516 A1 | 10/2014 | Stanaland | |
| 2015/0240460 A1 | 8/2015 | Ball et al. | |

OTHER PUBLICATIONS

Notice of Allowance for U.S. Appl. No. 29/514,306, mailed Apr. 24, 2015 10 pages.
Notice of Allowance for U.S. Appl. No. 29/514,307, mailed May 7, 2015 7 pages.
Notice of Allowance for U.S. Appl. No. 29/514,308, mailed Jul. 7, 2015 7 pages.
U.S. Appl. No. 29/503,651, filed Sep. 29, 2014, Ball et al.
U.S. Appl. No. 29/503,653, filed Sep. 29, 2014, Ball et al.
U.S. Appl. No. 29/514,306, filed Jan. 10, 2015, Ball et al.
U.S. Appl. No. 29/514,307, filed Jan. 10, 2015, Ball et al.
U.S. Appl. No. 29/514,308, filed Jan. 10, 2015, Ball et al.
U.S. Appl. No. 29/519,131, filed Mar. 2, 2015, Ball et al.
U.S. Appl. No. 29/519,956, filed Mar. 9, 2015, Ball et al.
U.S. Appl. No. 29/519,957, filed Mar. 9, 2015, Ball et al.
Notice of Allowance for U.S. Appl. No. 29/503,651, mailed Mar. 3, 2015, 10 pages.
Notice of Allowance for U.S. Appl. No. 29/503,653, mailed Mar. 4, 2015, 10 pages.
Official Action for U.S. Appl. No. 29/514,306, mailed Mar. 4, 2015, 9 pages.
Official Action for U.S. Appl. No. 29/514,307, mailed Mar. 11, 2015, 7 pages.
Official Action for U.S. Appl. No. 29/514,308, mailed Mar. 11, 2015, 7 pages.
U.S. Appl. No. 29/569,533, filed Jun. 28, 2016, Ball et al.
U.S. Appl. No. 29/569,524, filed Jun. 28, 2016, Ball et al.
U.S. Appl. No. 29/569,527, filed Jun. 28, 2016, Ball et al.
U.S. Appl. No. 29/570,362, filed Jul. 7, 2016, Ball et al.
Official Action for U.S. Appl. No. 14/710,350, mailed Apr. 20, 2016, 13 pages.
Official Action for U.S. Appl. No. 29/529,465, mailed Feb. 25, 2016, 9 pages.
Final Action for U.S. Appl. No. 29/529,465, mailed Jun. 6, 2016, 7 pages.
Official Action for U.S. Appl. No. 29/519,131, mailed Jan. 22, 2016, 10 pages.
Notice of Allowance for U.S. Appl. No. 29/519,131, mailed Mar. 30, 2016, 5 pages.
Official Action for U.S. Appl. No. 29/519,956, mailed Jan. 11, 2016, 9 pages.
Notice of Allowance for U.S. Appl. No. 29/519,956, mailed May 31, 2016, 5 pages.
Official Action for U.S. Appl. No. 29/519,957, mailed Jan. 11, 2016, 9 pages.
Notice of Allowance for U.S. Appl. No. 29/519,957, mailed Jun. 9, 2016, 5 pages.

* cited by examiner

HYDRANT ENCLOSURE WITH INTEGRAL FAUCET

This application claims the benefit of U.S. Provisional Patent Application Ser. No. 61/841,597, filed Jul. 1, 2013, the entire disclosure of which is incorporated by reference herein.

This application is related to U.S. patent application Ser. No. 12/560,721, filed Sep. 16, 2009, the entire disclosure of which is incorporated by reference herein.

FIELD OF THE INVENTION

Embodiments of the present invention are generally related to an enclosure for concealing and protecting a hydrant.

BACKGROUND OF THE INVENTION

Wall hydrants generally comprise a support plate with interconnected faucet, a means to control fluid flow through the faucet, a fluid supply tube, a valve, and a tube that contains a mechanism operates the valve. Those of skill in the art will appreciate that the fluid supply tube can also include the means to control the fluid flow.

Protective enclosures that conceal and protect hydrants are common and often incorporated into interior or exterior building walls. Enclosures are generally comprised of a box with an interconnected door. The enclosure prevents operation of the faucet, prevents theft of hydrant components (e.g., brass), protects the hydrant from environmental elements, and provides a means to incorporate the hydrant into a wall.

The enclosure door may be selectively locked. Enclosures are made in various sizes and shapes and may accommodate a single or dual hydrant. Existing enclosures are rigidly mounted to a wall and are difficult to replace. That is, if an enclosure is in need of repair, the hydrant must be disconnected, the hydrant removed, and the box must be removed from the wall. One of skill the art will appreciate that this method of repair is inefficient as, often, only the door is damaged. For example, keys that are used to open door locks are often lost, and maintenance personnel often pry the door open, which damages the door. Thereafter, the door must be replaced to ensure that the door can be locked or closed properly.

Referring now to FIGS. 1-6 a wall hydrant 2 and associated enclosure 66 of the prior art is shown. The hydrant 2 comprises a plate 10 that accommodates a fluid outlet and has a plurality of tube bosses extending therefrom. A control tube boss 18 receives a control tube 22, and a fluid tube boss 26 receives a fluid supply tube 30. The fluid supply tube and the control tube are connected to their respective bosses and to a valve 34. An outside surface of the plate 10 includes an aperture 42 that received a key 46 that is selectively interconnected to a stem screw 50. The key controls the flow of water by way of a control rod 54. Again, the outside surface of the plate 10 includes a fluid outlet that may be interconnected to backflow preventer 58. A backflow preventer used by some embodiments is disclosed in U.S. Pat. No. 8,042,565, which is incorporated by reference herein.

In operation, the user interconnects the key 46 to the stem screw 50. The stem screw 50 is operatively interconnected to the control rod 54. Turning the key 46 moves the control rod 54 and moves the plunger 62 away from a valve 34 to allow fluid flow through the fluid supply tube 30 as shown in FIG. 2. When the key 46 is turned in the opposite direction, the control rod will move the plunger 62 into engagement with the valve 34 as shown in FIG. 3, which prevents fluid flow through the fluid supply tube 30.

The enclosure 66 that receives the wall hydrant is shown in FIGS. 4-6. The enclosure 66 comprises a box 70 and a door 74. The box 70 has sufficient depth to receive a plate 10 and interconnected backflow preventer 58. The key 46 may also be left interconnected to the stem screw 50 in some instances. The depth of the box 70 allows for the door 74 to be closed to conceal the entire wall hydrant 2 and included backflow preventer 58. The plate is bolted or otherwise interconnected to a rear surface of the box.

Those of skill in the art will appreciate enclosures are difficult to install, are heavy, and sometimes, difficult to use. More specifically, as the plate 10 and associated backflow preventer 58 are inset relative to a front edge 78 of the box 70, it is often difficult for users to engage the key 46, or turn a knob, to initiate fluid flow. Further, if the door 74 is damaged, the entire enclosure 66 must be removed.

It is thus a long felt need to provide a hydrant enclosure that is easy to install, easy to use, that accepts various types of fluid connections, and has a replaceable door. These and other features, alone or in combination, are provided by the embodiments the present invention, which will be described below.

SUMMARY OF THE INVENTION

It is one aspect of embodiments of the present invention to provide an enclosure with an integrated hydrant. More specifically, one embodiment is a hydrant enclosure defined by a plate with an outwardly-extending lip. The plate also includes at least one cavity recessed relative to a plate inner surface toward a plate outer surface. The recess allows for larger components, such as backflow preventers and control knobs, to be accommodated when the enclosure door is closed. The enclosure of this embodiment is smaller and more compact than those of the prior art.

It is another aspect of embodiments of the present invention to provide an enclosure that saves material. More specifically, the fluid control tube and fluid delivery tube are directly interconnected to the box and a support plate is omitted. Further, the recess is in fluidic communication with a fluid supply boss. Unlike the prior art systems, the fluid supply boss is interconnected to a conduit integrated into the box that provides fluid to the recess that receives a backflow preventer. Materials, such as brass, steel, iron, etc. commonly associated with prior hydrant plates are integrated directly into the enclosure plate, thus significant material savings are realized.

It is yet another aspect of embodiments of the present invention to provide an enclosure with a selectively removable door. The door may be interconnected to the lip extending from the plate. The door may also be fastened to the plate outer surface and selectively interconnected thereto which allows door replacement. Those of skill in the art will appreciate that the door will wear or be damaged. Instead of removing the enclosure from the wall, embodiments of the present invention allow the door to be removed from the enclosure and replaced.

It is still yet another aspect of embodiments the present invention to provide an aesthetically pleasing door. More specifically, the size of the hydrant enclosure and associated door may be modified to accommodate larger fluid supply mechanisms. The door may be made to correspond to the dimensions and character of building materials, such as stone or brick. In one embodiment, an outer surface of the door is textured or painted to match brick such that the hydrant is substantially hidden when not in use.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described below. Further, The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
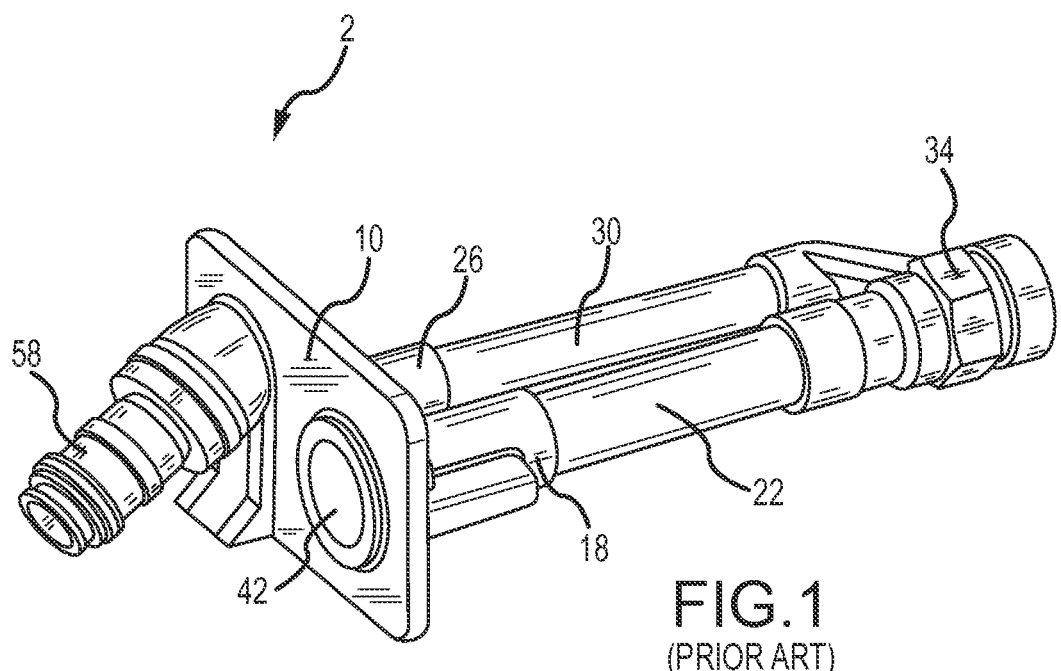
FIG. 1 is a perspective view of a prior art hydrant.
Figure 2:
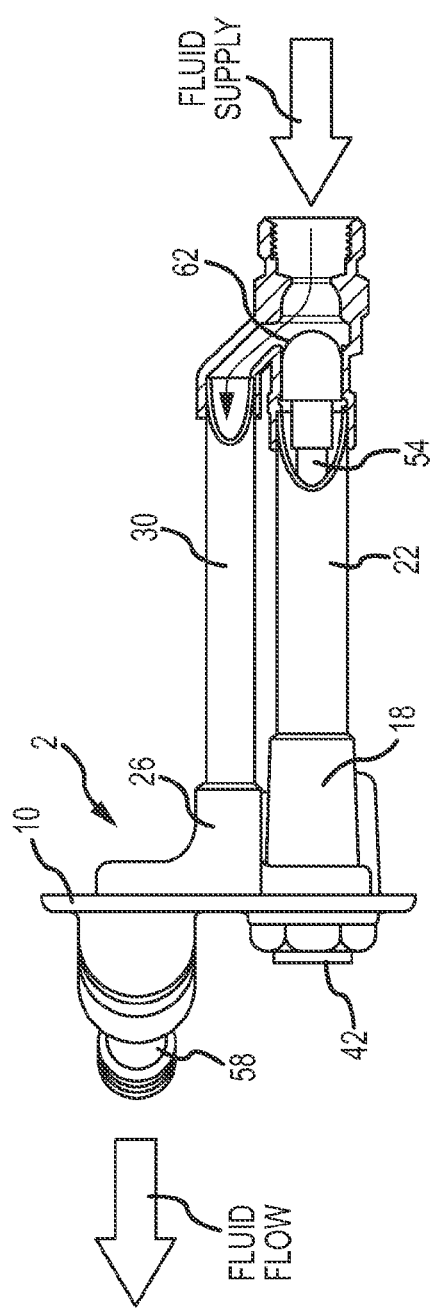
FIG. 2 is a top elevation view of FIG. 1, wherein fluid is shown exiting the hydrant.
Figure 3:
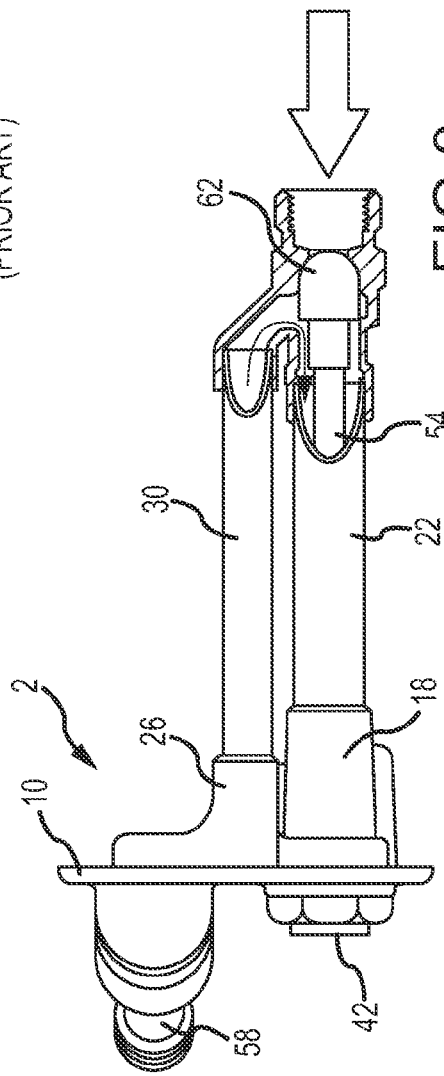
FIG. 3 is a top elevation view of FIG. 1, wherein fluid is not flowing from the hydrant.

To assist in the understanding of one embodiment of the present invention the following list of components and associated numbering found in the drawings is provided herein:

| # | Component |
|---|---|
| 2 | Hydrant |
| 6 | Enclosure |
| 10 | Plate |
| 14 | Faucet |
| 18 | Controlled tube boss |
| 22 | Control tube |
| 26 | Fluid tube boss |
| 30 | Fluid supply tube |
| 34 | Valve |
| 28 | Outside surface |
| 42 | Aperture |
| 46 | Key |
| 50 | Stem screw |
| 54 | Control Rod |
| 58 | Backflow preventer |
| 62 | Plunger |
| 66 | Enclosure |
| 70 | Box |
| 74 | Door |
| 76 | Lock |
| 78 | Front edge |
| 100 | Enclosure |
| 104 | Plate |
| 106 | Recess |
| 108 | Lip |
| 112 | Inner surface |
| 116 | Outer surface |
| 120 | Backflow preventer |
| 124 | Opening |
| 128 | Stem screw |
| 132 | Protrusion |
| 136 | Conduit |
| 140 | Fluid supply tube |
| 144 | Valve |
| 148 | Boss |
| 152 | Control tube |
| 162 | Door |
| 166 | Hinge plate |
| 170 | Protrusions |
| 174 | Fasteners |
| 178 | Lock |
| 182 | Protrusion |
| 188 | Inner surface |
| 192 | Lip |
| 200 | Enclosure |
| 206 | Recess |
| 212 | Inner surface |
| 216 | Outer surface |
| 220 | Backflow preventer |
| 224 | Opening |
| 228 | Stem screw |
| 232 | Protrusion |
| 236 | Conduit |
| 240 | Fluid supply tube |
| 244 | Valve |
| 248 | Boss |
| 252 | Control tube |
| 262 | Door |
| 278 | Lock |
| 292 | Lip |
| 294 | Pin |
| 298 | Fluid flow path |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 4:
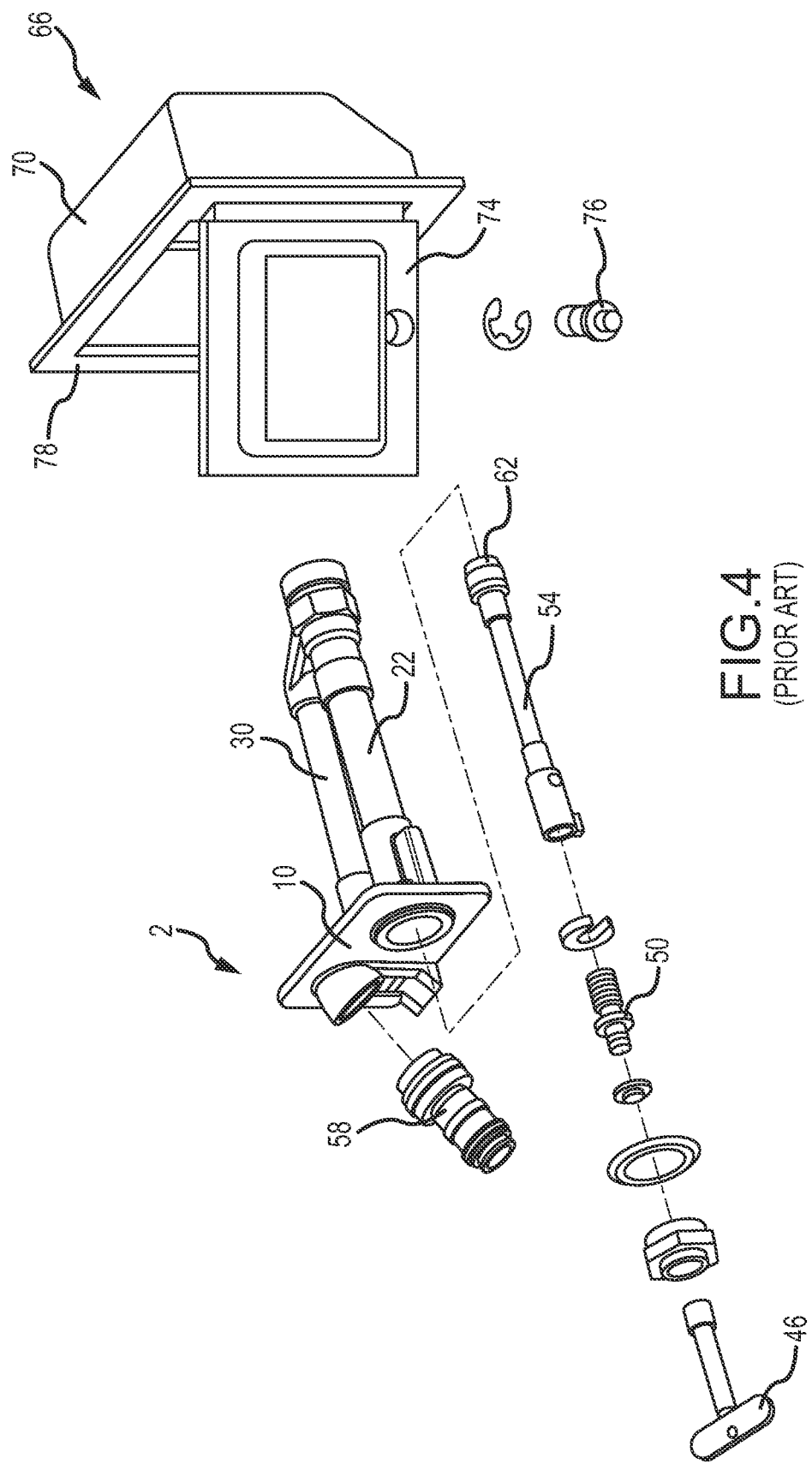
FIG. 4 is an exploded perspective view showing a hydrant and an enclosure.
Figure 5:
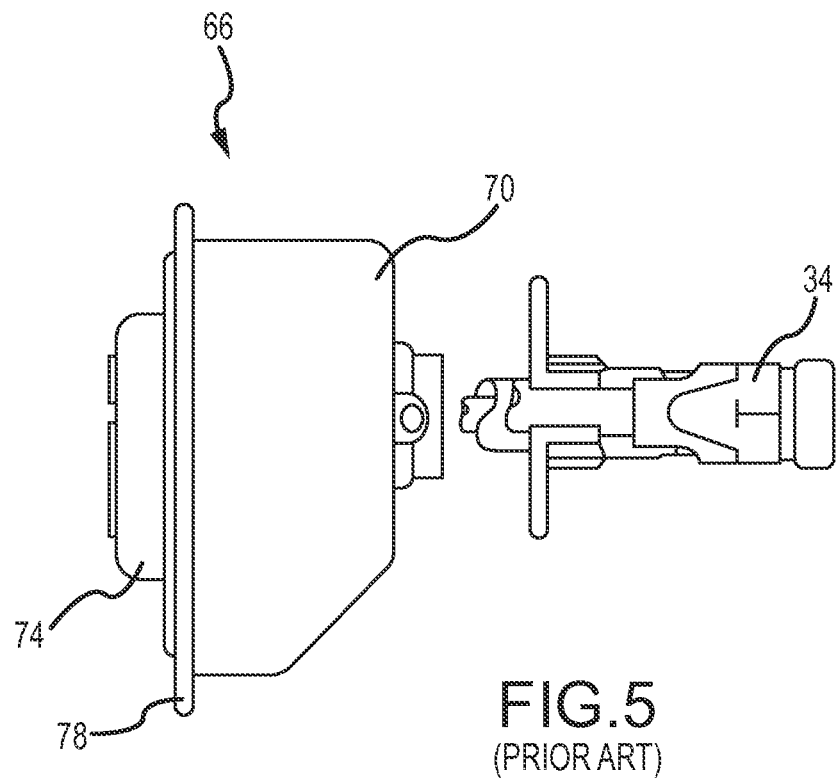
FIG. 5 is a side elevation view of a hydrant positioned within a enclosure.
Figure 6:
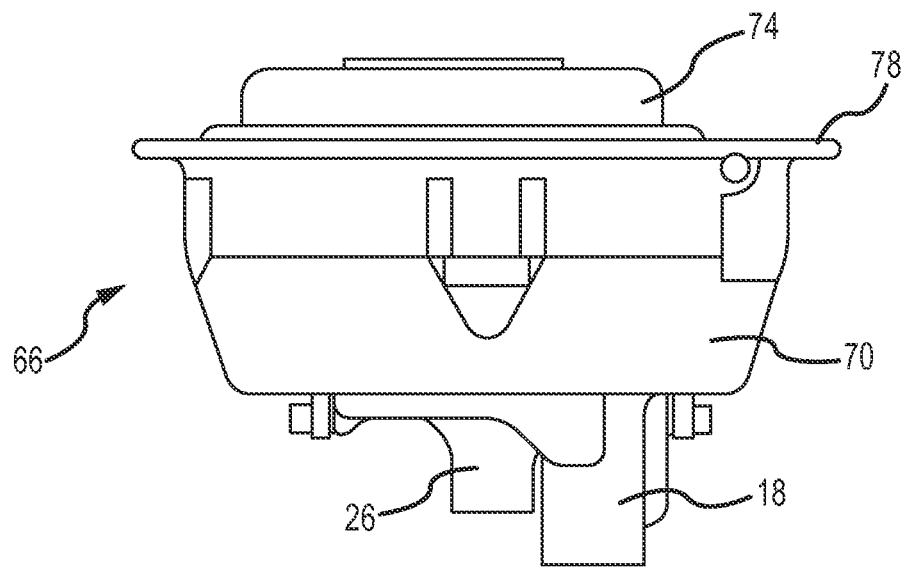
FIG. 6 is a top elevation view of FIG. 5.

FIGS. 7-11 show an enclosure 100 having integrated hydrant of one embodiment of the present invention. The enclosure 100 is defined by a plate 104 with an outwardly-extending lip 108. The plate 104 has an inner surface 112 and an outer surface 116. The plate 104 has a recess 106 that extends from the inner surface 112 toward the outer surface 116. The plate 104 also includes an opening 124 that receives a control rod and stem screw has shown in FIG. 4.

Figure 7:
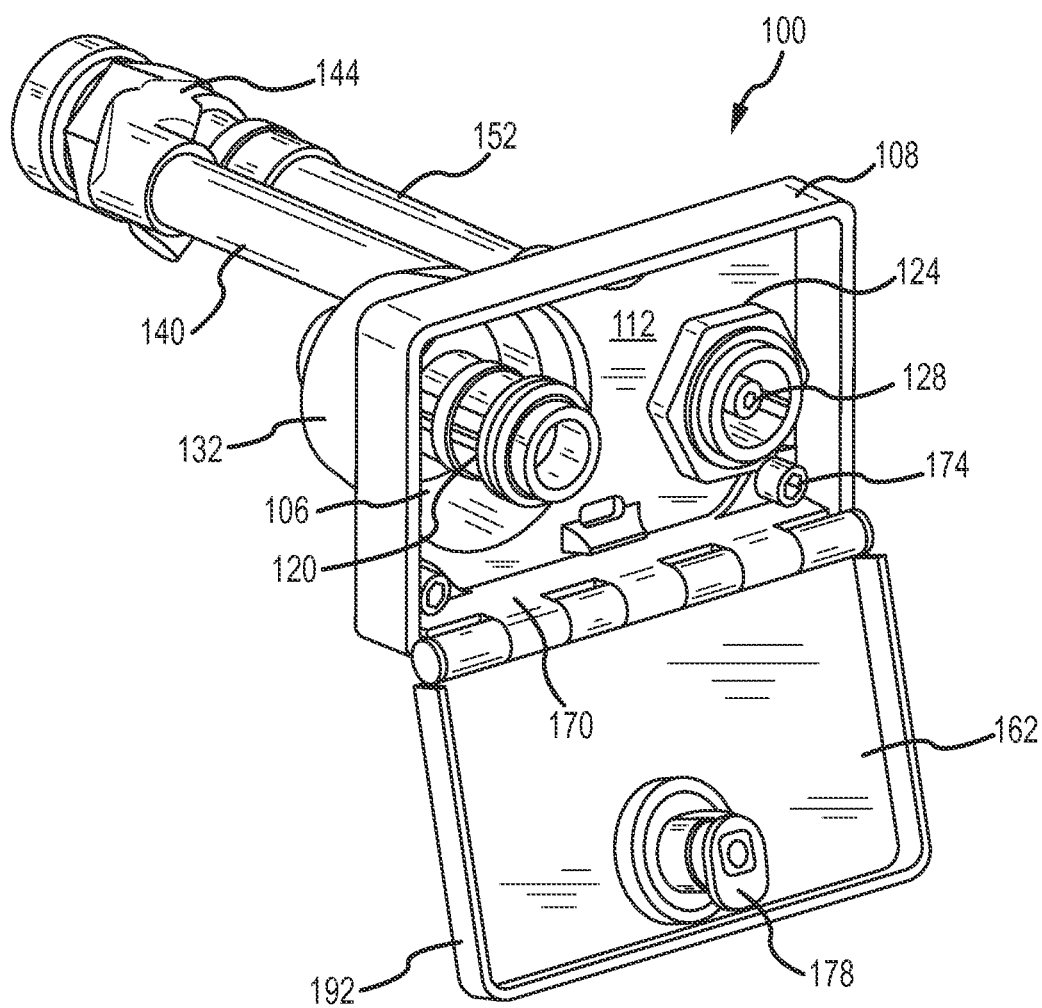
FIG. 7 is a perspective view of an enclosure of one embodiment of the present invention wherein a door is open.
Figure 8:
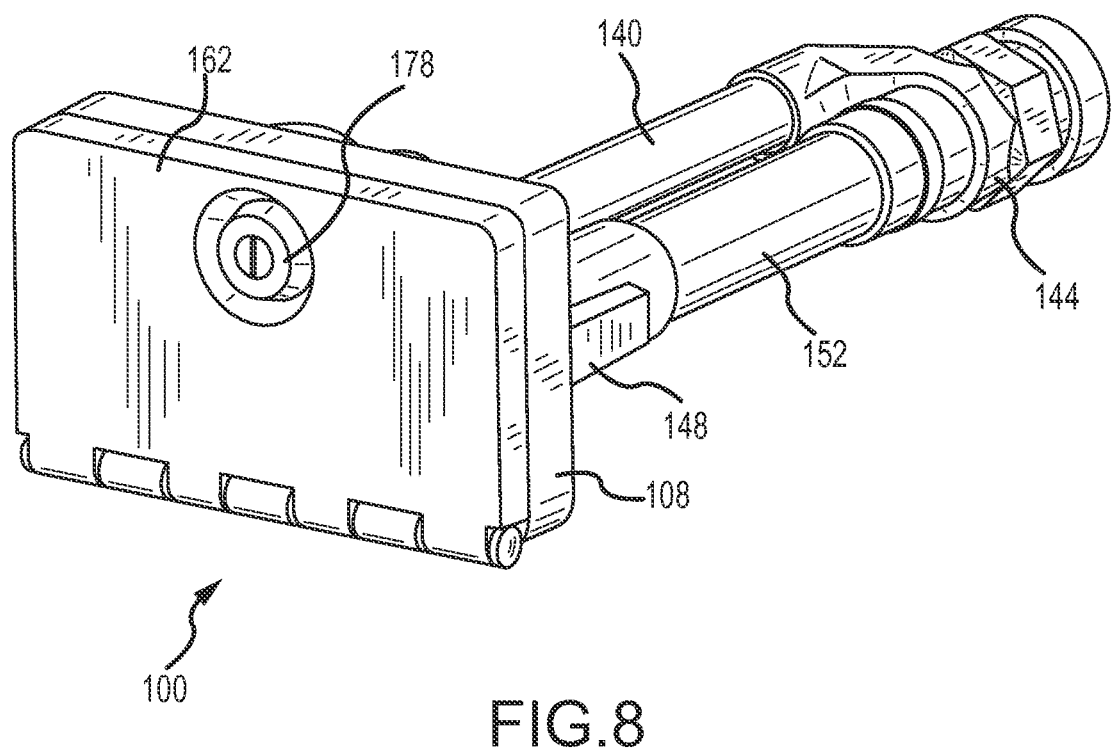
FIG. 8 is a perspective view similar to that of FIG. 7 wherein the door is closed.
Figure 11:
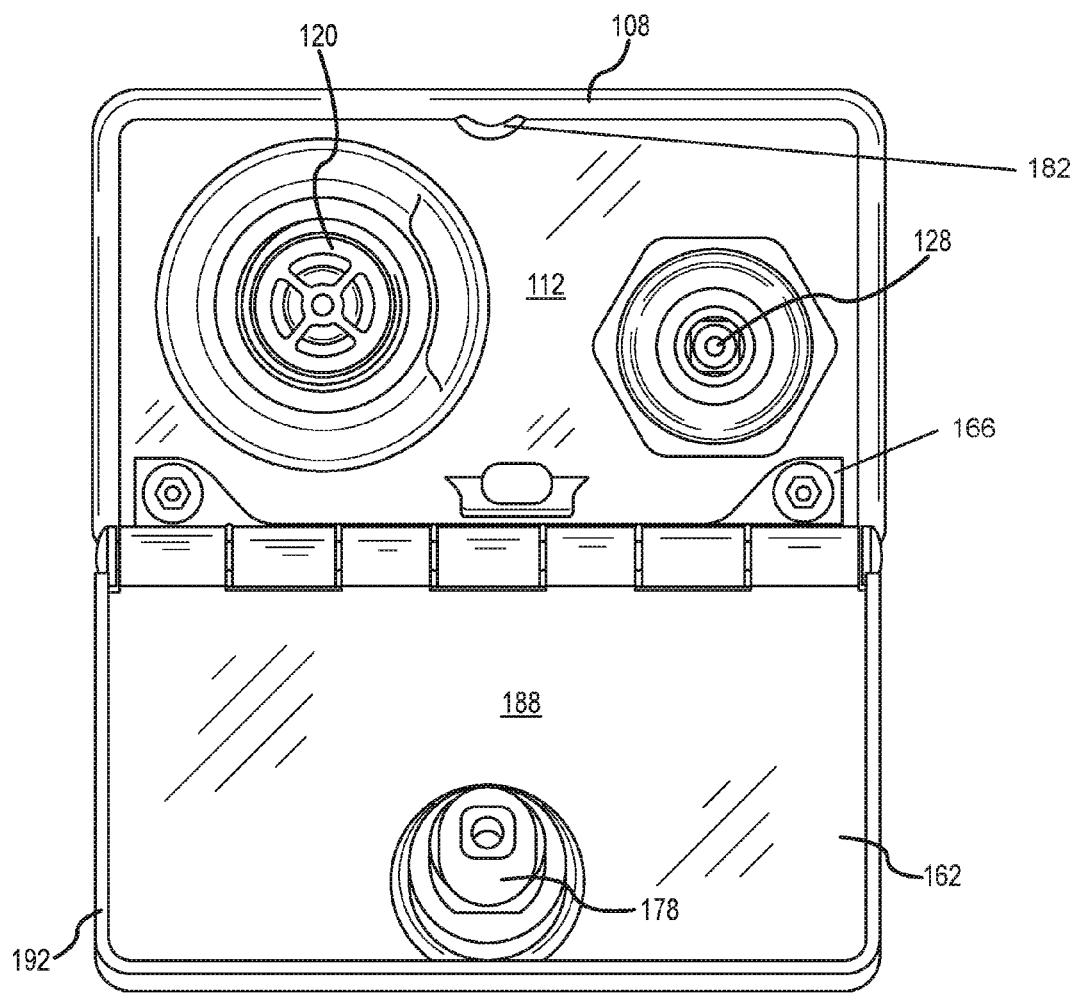
FIG. 11 is a front elevation view of FIG. 7.
Figure 12:
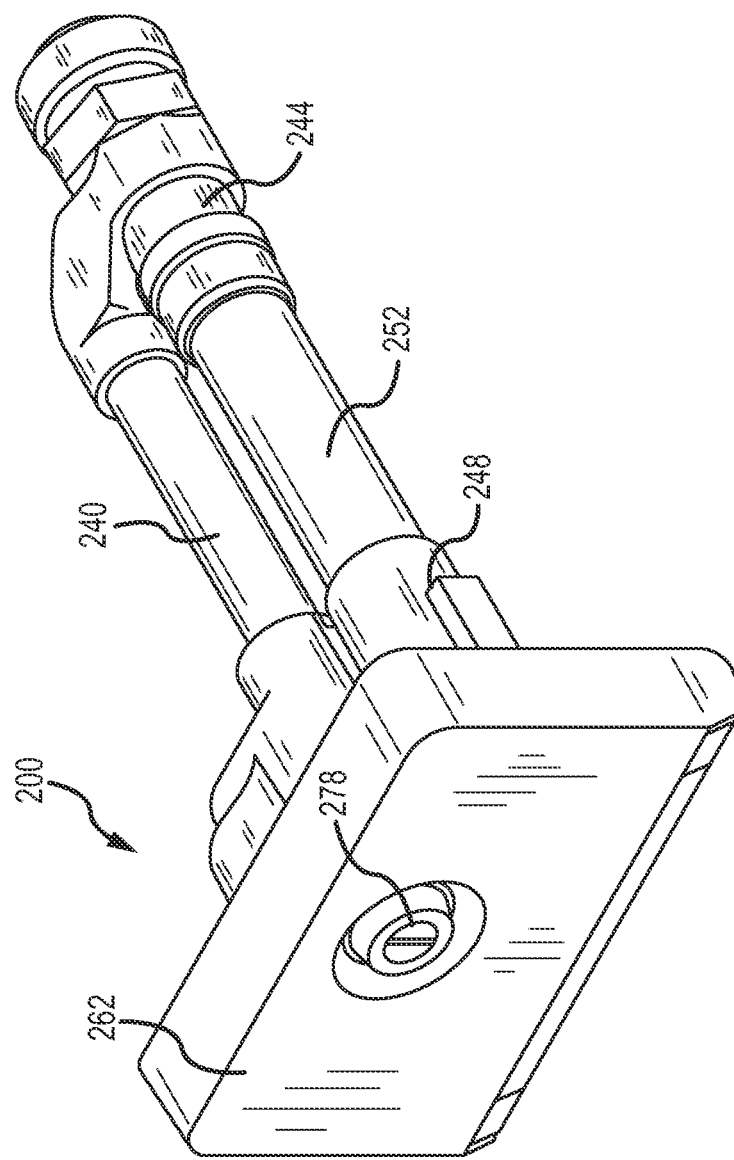
FIG. 12 is a front perspective view of an enclosure with an integrated hydrant of another embodiment of the present invention.

FIGS. 7 and 11 show the inner surface 112 adapted to receive a backflow preventer 120. The backflow preventer 120 is positioned within the recess 106 such that an outer edge of the backflow preventer 120 does not extend from the inner surface 112 to an extent that adversely affects door closure.

Figure 9:
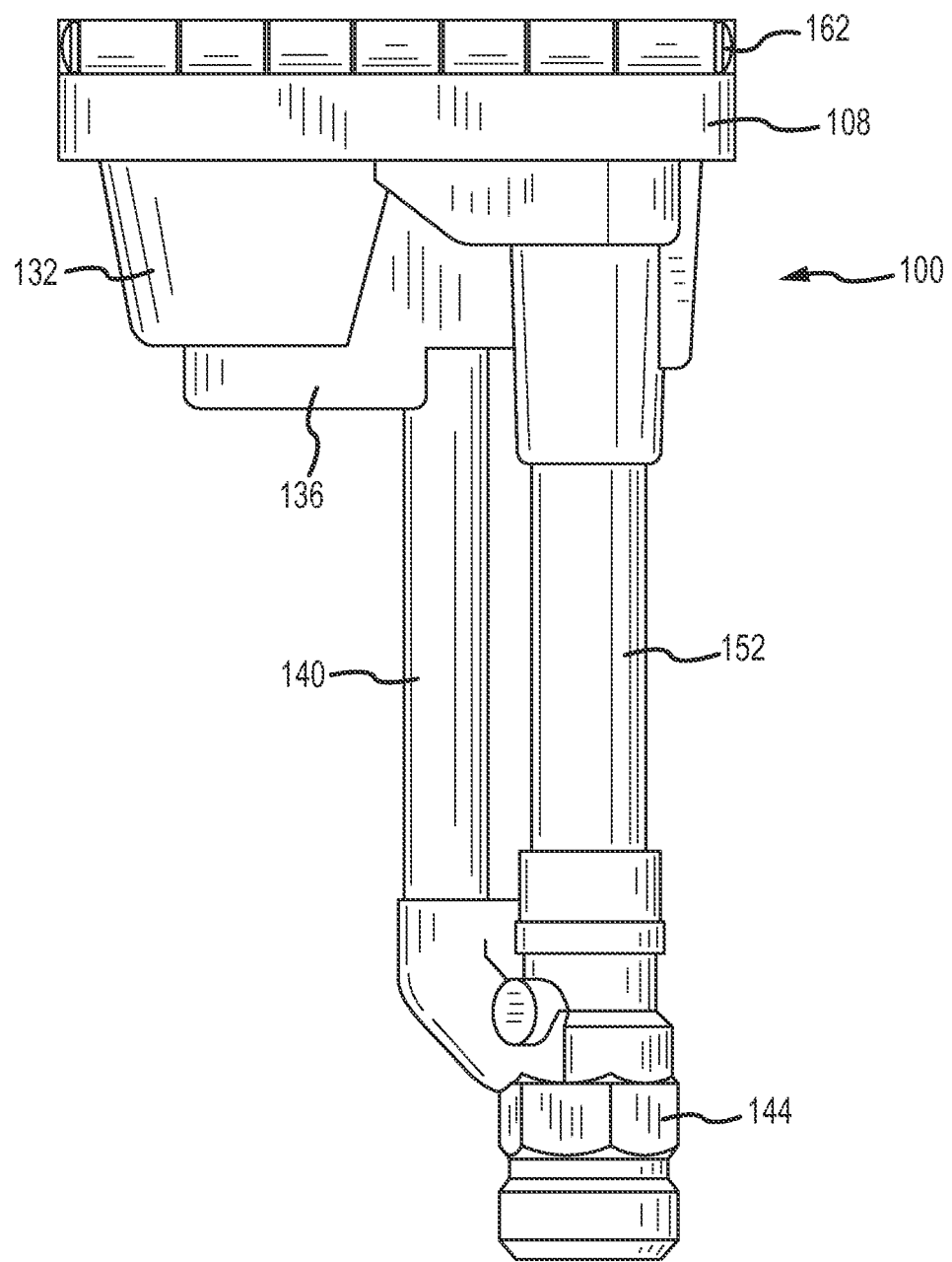
FIG. 9 is a top elevation view of FIG. 8.
Figure 10:
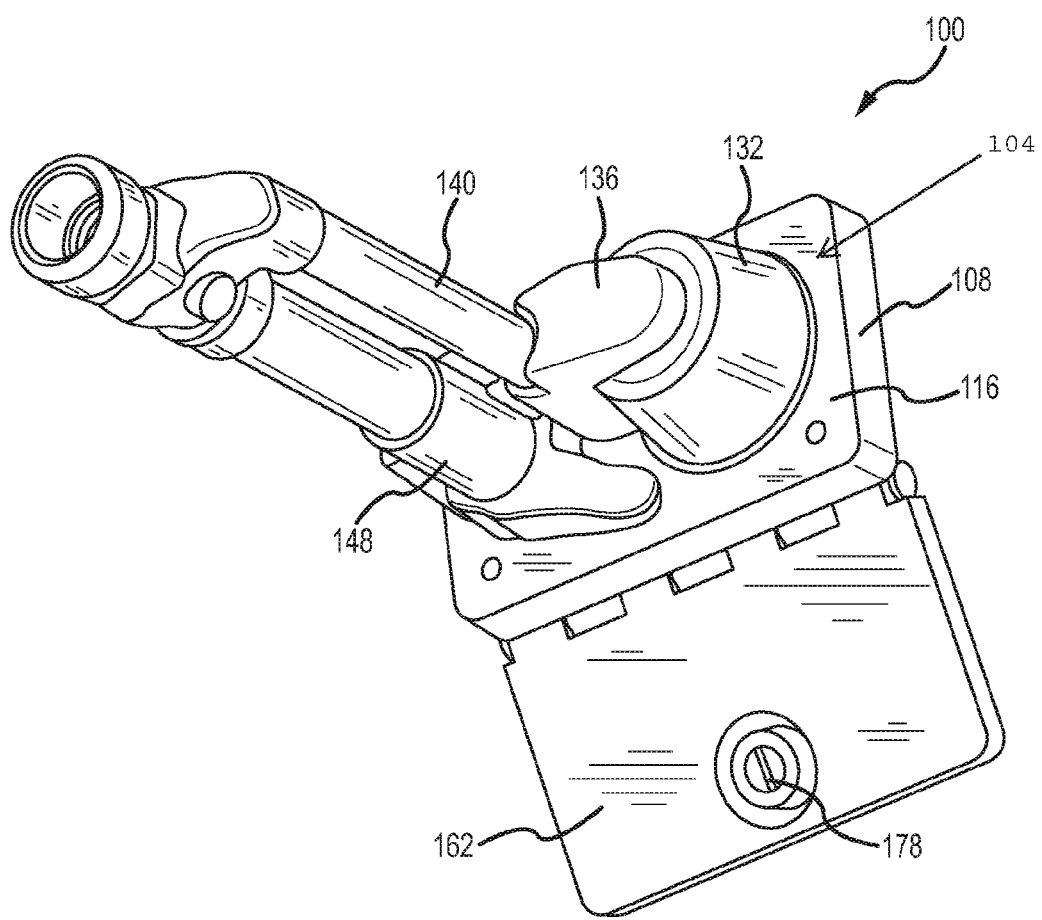
FIG. 10 is a rear perspective view of FIG. 7.

FIGS. 9 and 10 show a rear portion of the enclosure 100. The recess in the plate forms outwardly-extending protrusion 132, which in one embodiment is frusto-conical. The protrusion 132 has an outer surface that includes an opening (not shown) that communicates with a conduit 136 that connects fluid supply tube 140 to the backflow preventer. Those of skill the art will appreciate that the fluid supply tube 140 may be directly interconnected to the protrusion 132, but such configuration may not be ideal as the size of the valve 144, or length of the fluid supply tube 140 would have to be increased or lengthened, which will increase material costs. The outer surface 116 of the plate also includes a boss 148 that supports the control tube 152.

In operation, the user interconnects the key to the stem screw 128 and turns the same, which removes the plunger from the valve 144, which allows fluid to escape through the fluid supply tube 140. Fluid exits the backflow preventer 120. Turning the key in the opposite direction places the plunger back into engagement with the valve 144 to cease fluid flow through the fluid supply tube 140. After shut off, fluid may be in the fluid supply tube 140 and the control tube 152. Thus, in one embodiment, the fluid supply tube 140 and the control tube 152 are angled relative to the outer surface 116 of the hydrant so fluid will leak from the hydrant after the plunger is seated in the valve.

One embodiment of the present invention includes a door 162 as shown in FIGS. 7-11. The door 162 is hingedly interconnected to a hinge plate 166 that is interconnected to at least one of the lip 108 or the plate inner surface 112. Here, the hinge plate 166 includes a plurality of protrusions 170 that receive fasteners 174 that engage the inner surface 112. The door 162 may also include a lock 178 that selectively engages a protrusion 182 extending from the inner surface 112. If the door becomes damaged or the user decides to change the look of the door 162, the door 162 is opened to expose the fasteners 174, which are removed, and a new door is interconnected to the plate 104.

Indeed, the internal volume of the enclosure 100 may be increased to accommodate one or two fluid flow supply tubes and associated backflow preventers. More specifically, some hydrants include hot and cold water delivery means and it is within the skill of those of skill in the art to expand the size of the enclosure to accommodate the same.

FIGS. 12-19 show an enclosure 200 having integrated hydrant of another embodiment of the present invention. The enclosure 200 is defined by a plate 204 with an inner surface 212 and an outer surface 216. The plate 204 has a recess 206 that extends from the inner surface 212 toward the outer surface 216. The plate 204 also includes an opening 224 that receives a control rod and stem screw 228 has shown in FIG. 4.

The inner surface 212 is adapted to receive a backflow preventer 220. The backflow preventer 220 is positioned within the recess 206 such that an outer edge of the backflow preventer 220 does not extend from the inner surface 212 to an extent that adversely affects door closure.

Figure 13:
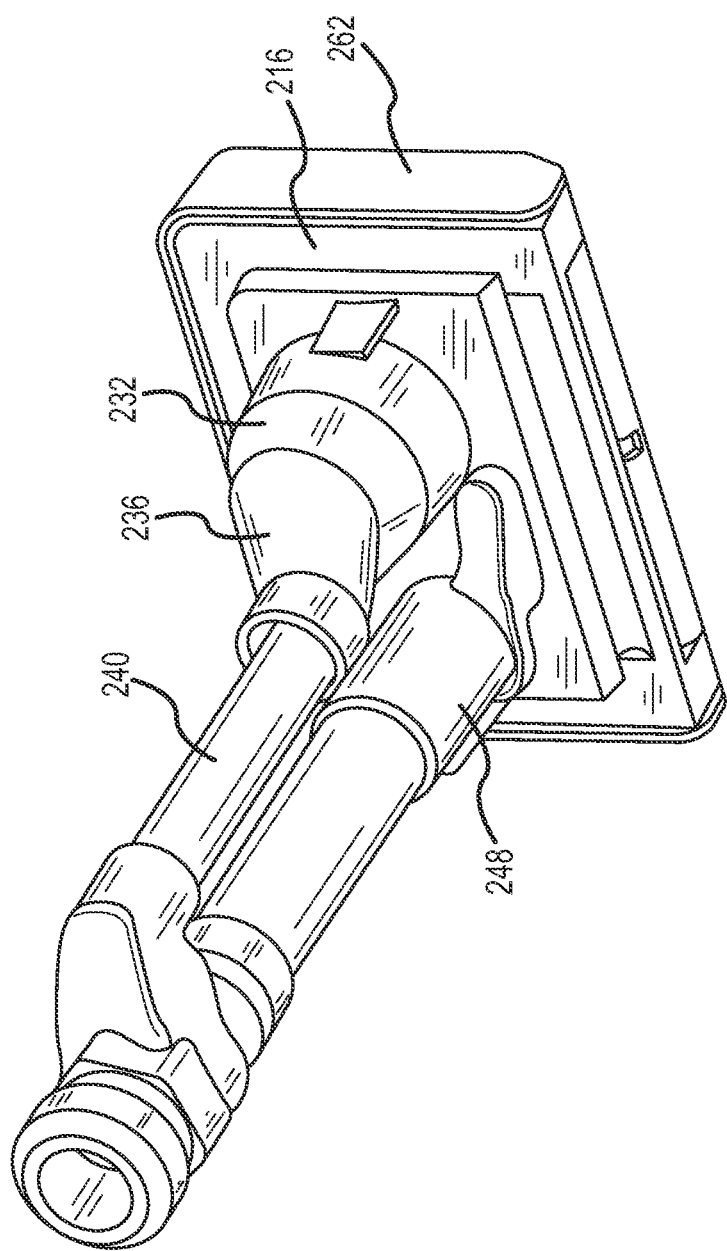
FIG. 13 is a rear perspective view of the enclosure shown in FIG. 12.
Figure 14:
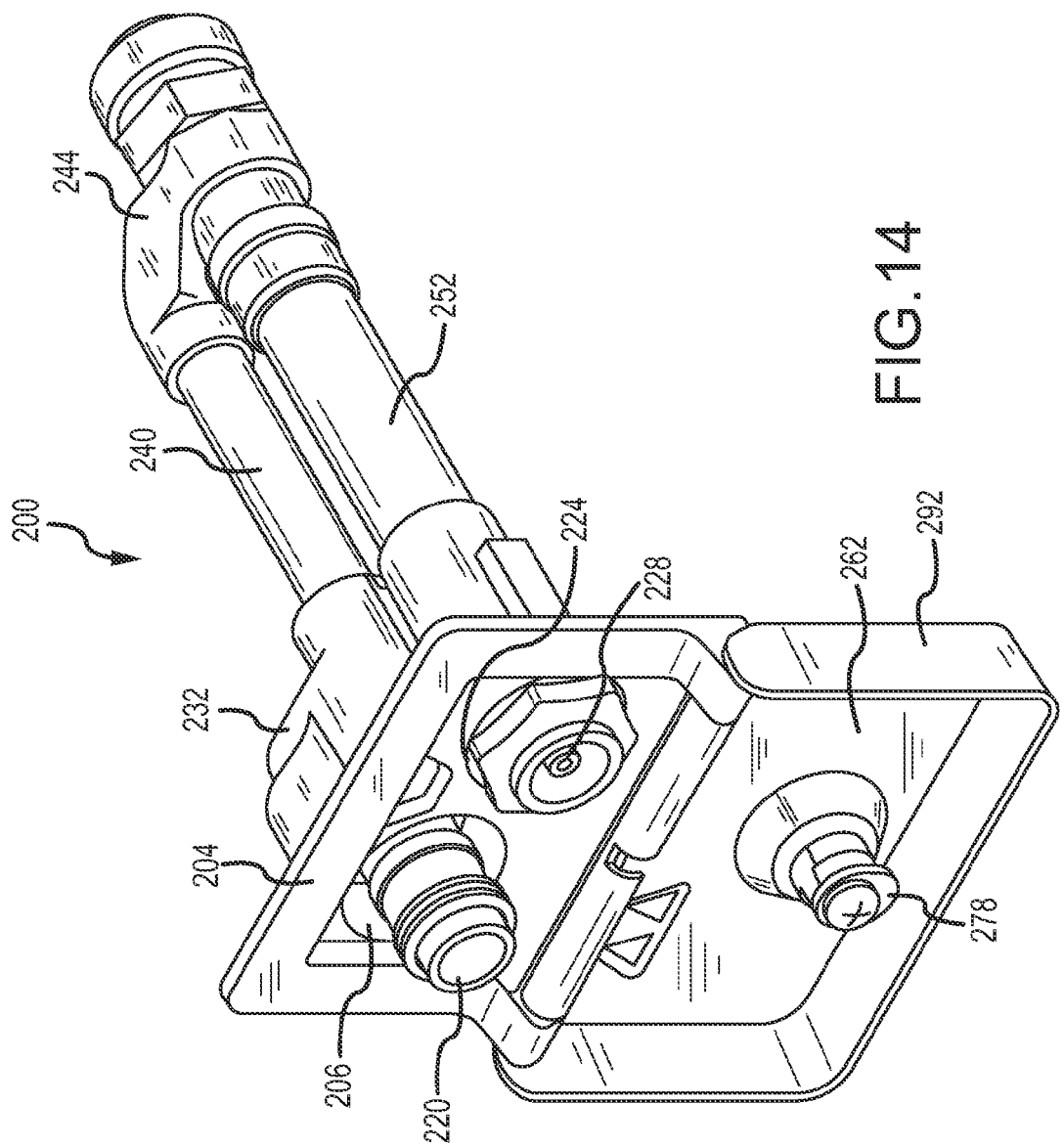
FIG. 14 is a front perspective view of the enclosure shown in FIG. 12 with a door open.
Figure 15:
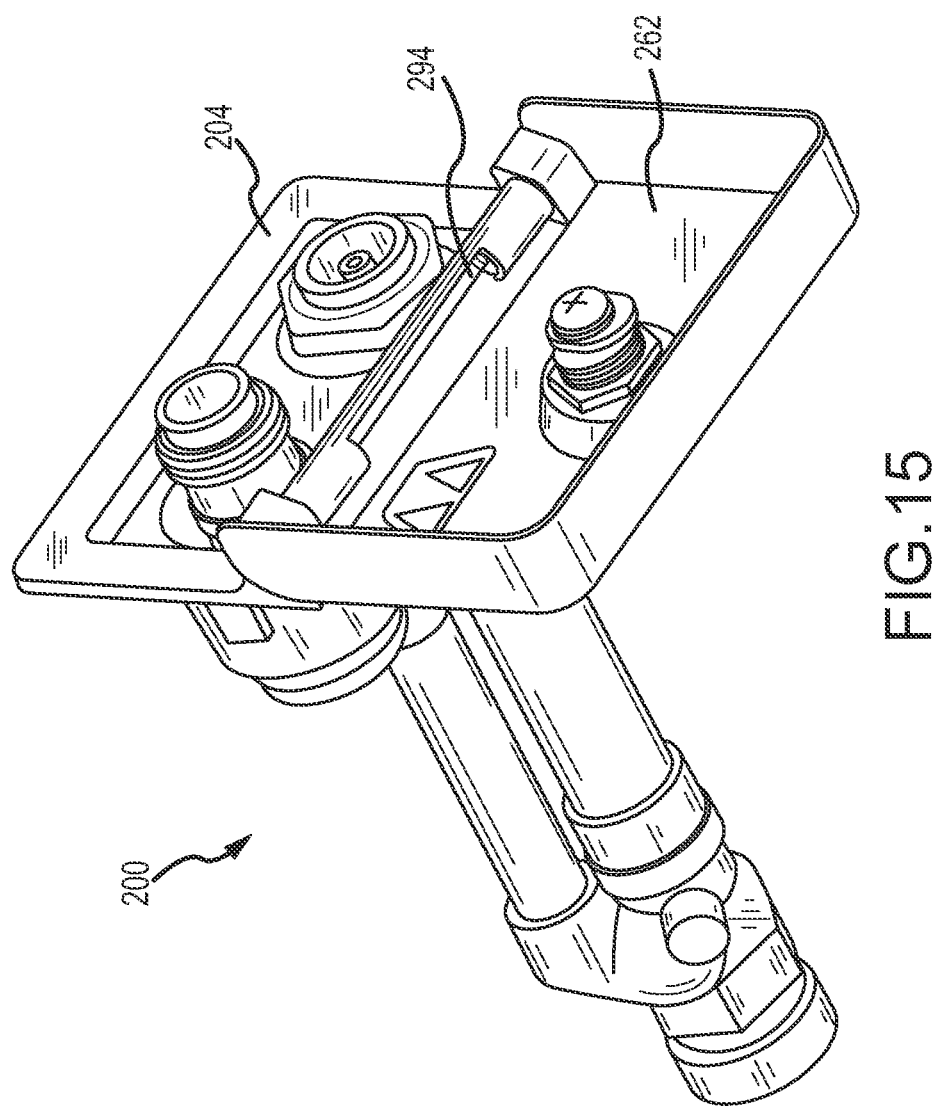
FIG. 15 is another front perspective view of the enclosure shown in FIG. 12 with a door open.
Figure 16:
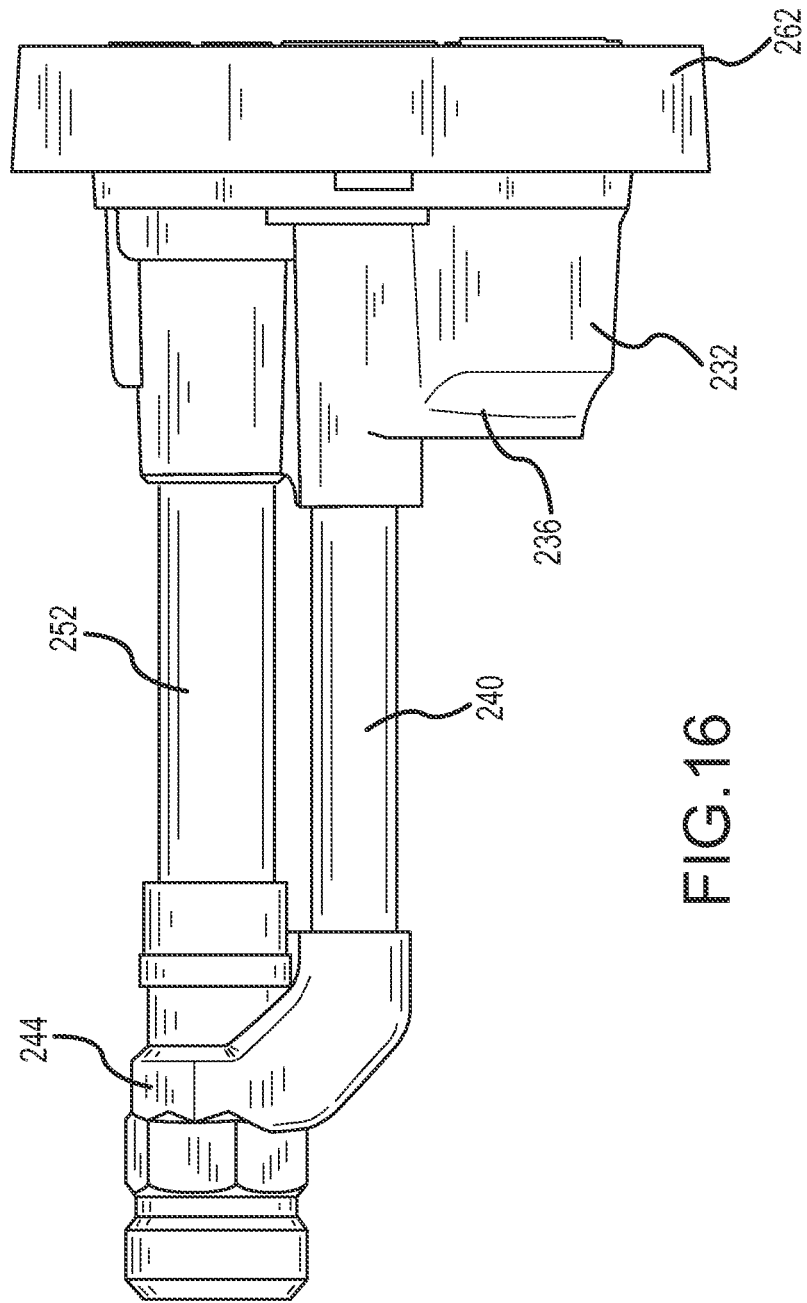
FIG. 16 is a top plan view of the enclosure shown in FIG. 12.
Figure 17:
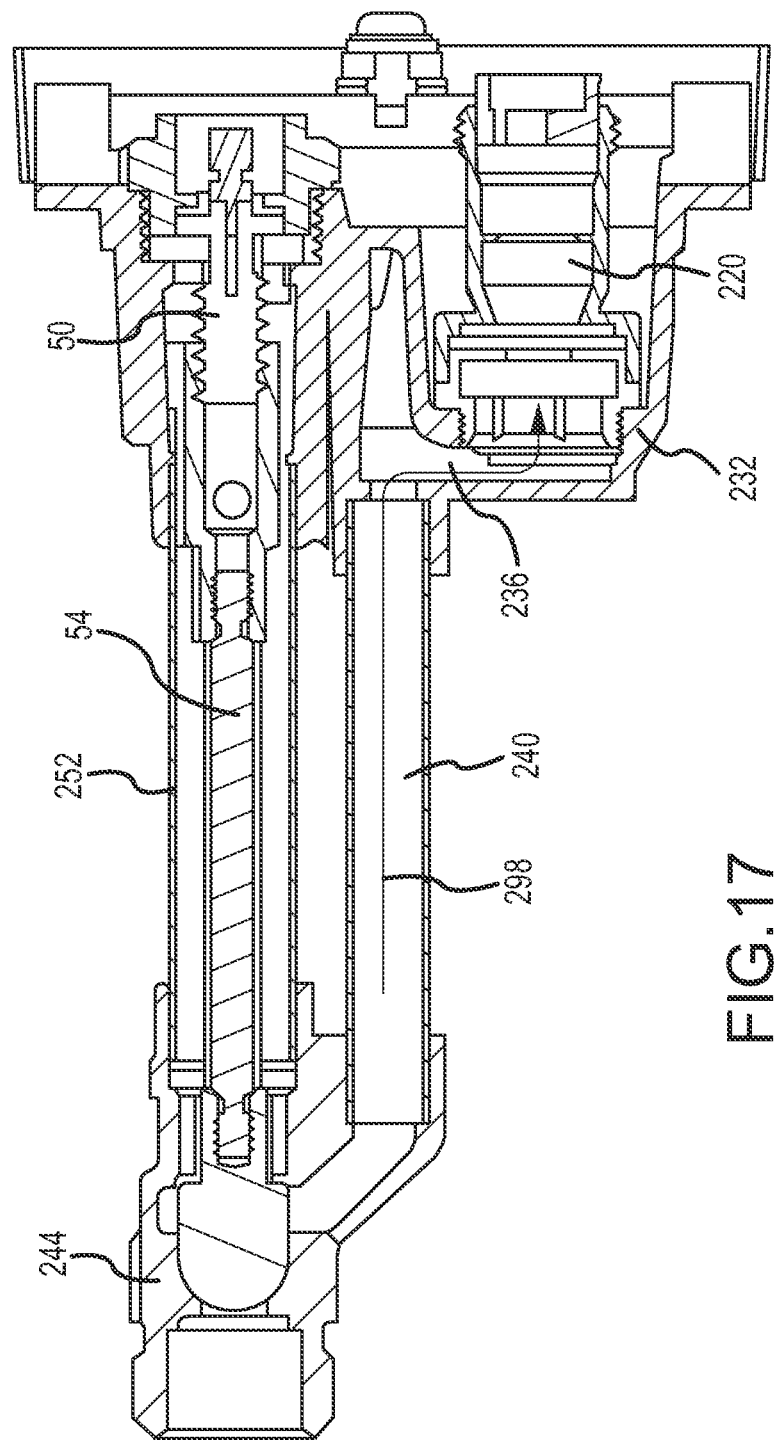
FIG. 17 is a cross sectional view of FIG. 16.
Figure 18:
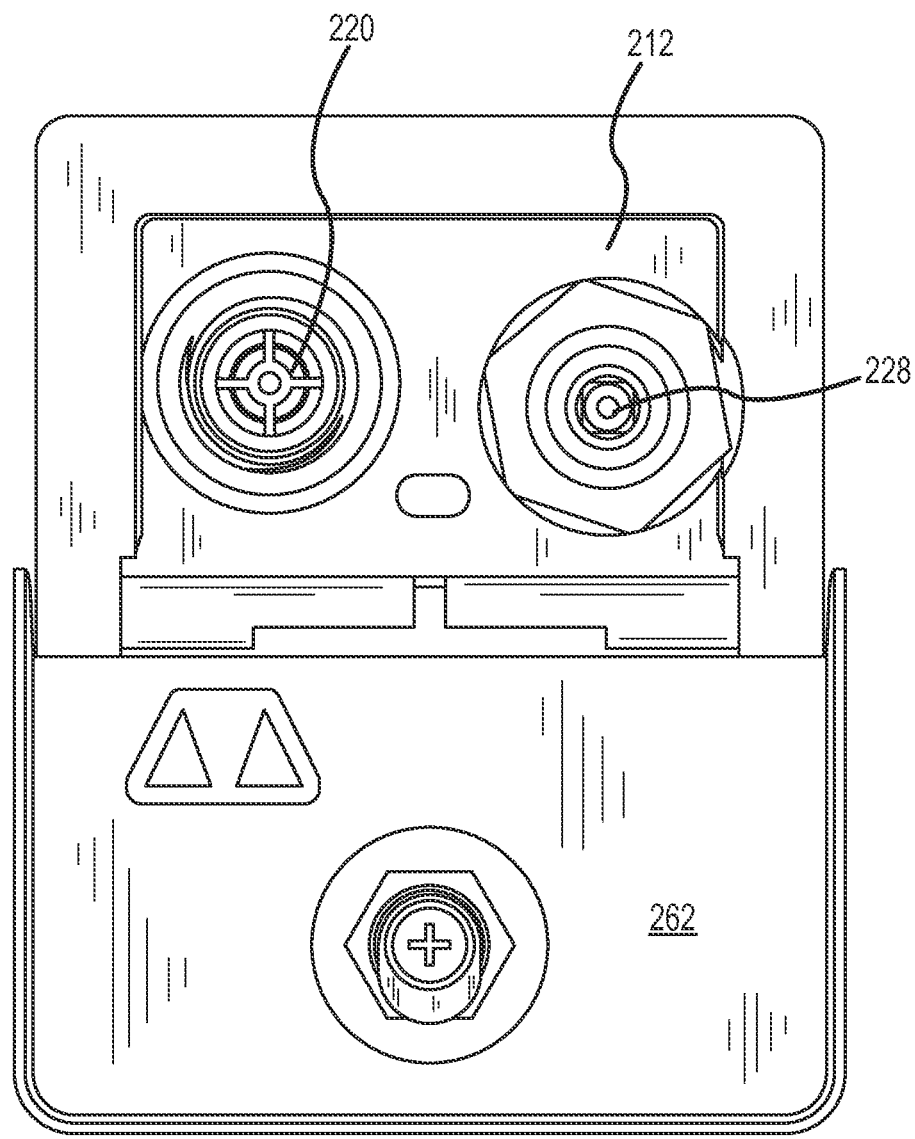
FIG. 18 is a front elevation view of the enclosure shown in FIG. 12.
Figure 19:
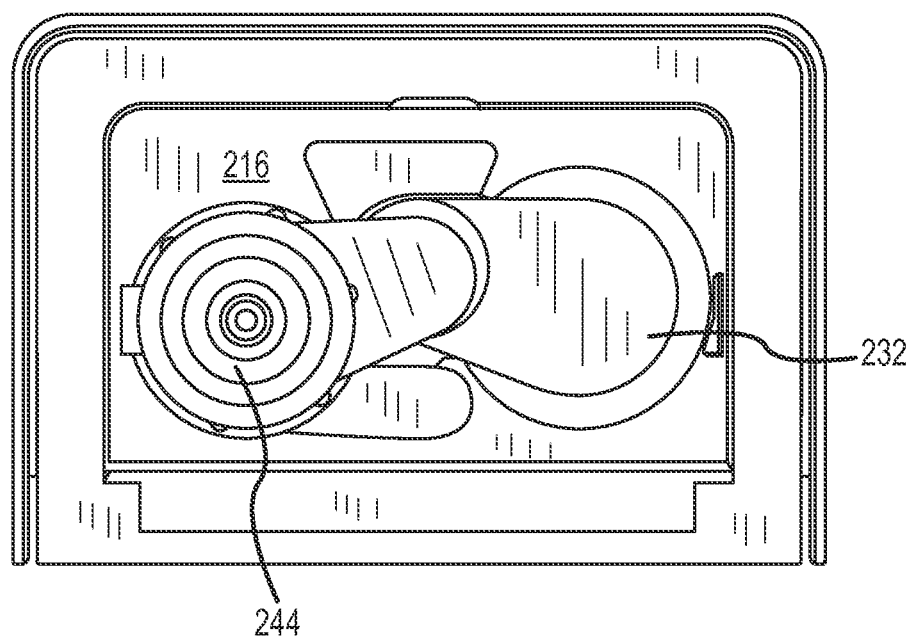
FIG. 19 is a back elevation view of the enclosure shown in FIG. 12.

FIGS. 13, 15, and 19 show a rear portion of the enclosure 200. The recess in the plate forms outwardly-extending protrusion 232, which in one embodiment is frusto-conical. The protrusion 232 has an outer surface that includes an opening (not shown) that communicates with a conduit 236 (see FIG. 17) that connects fluid supply tube 240 to the backflow preventer. Those of skill in the art will appreciate that the fluid supply line 240 may be directly interconnected to the protrusion 232, but such configuration may not be ideal as the size of the valve 244, or length of the fluid supply tube 240 would have to be increased or lengthened, which will increase material costs. The outer surface 216 of the plate also includes a boss 248 that supports the control tube 252.

In operation, the user interconnects the key to the stem screw 228 and turns the same, which removes the plunger from the valve 244, which allows fluid to escape through the fluid supply tube 240. Fluid travels through the conduit 236 along fluid flow path 298 and exits the backflow preventer 220. Turning the key in the opposite direction places the plunger back into engagement with the valve 244 to cease fluid flow through the fluid supply tube 240. After shut off, fluid may be in the fluid supply tube 240 and the control tube 252. Thus, in one embodiment, the fluid supply tube 240 and the control tube 252 are angled relative to the outer surface 216 of the hydrant so fluid will leak from the hydrant after the plunger is seated in the valve.

The door 262 of this embodiment includes a lip 292 and is hingedly interconnected to the plate 204. As shown in FIG. 15, the door 262 may be interconnected to the plate 204 by removable pins 294. The door 262 may also include a lock 278 that selectively engages a protrusion extending from the inner surface 212.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. An enclosure with integral hydrant, comprising:
   a plate having a first surface and a second surface;
   a lip integrally interconnected to and extending from said first surface;
   a recess integrated into said plate and extending from said first surface to said second surface, said recess defining a protrusion extending from said second surface, said protrusion having a third surface spaced from and generally parallel with said second surface;
   a first aperture through said plate and spaced from said recess;
   a second aperture through said third surface, said second aperture being a fluid outlet;

a first boss associated with said first aperture and extending from said second surface;

a second boss associated with said second aperture and extending from said third surface, said first boss spaced from said second boss;

a fluid conduit connecting said second boss to said recess;

wherein said plate, said lip, said protrusion, said first boss, said second boss, and said fluid conduit form a monolithic structure;

a control tube having a proximal end interconnected to said first boss;

a fluid supply tube having a proximal end interconnected to said second boss; and a valve with a fluid supply inlet, a first outlet interconnected to a distal end of said fluid supply tube, and a second outlet interconnected to a distal end of said control tube.

2. The enclosure of claim 1, further comprising a hinge plate interconnected to at least one of said lip and said first surface, and a door operatively interconnected to said hinge plate, said door capable of assuming a closed configuration wherein said first surface is concealed.

3. The enclosure of claim 2, wherein said hinge plate includes at least one protrusion that receives a fastener that interconnects said hinge plate to said first surface.

4. The enclosure of claim 2, wherein said door includes a lock.

5. The enclosure of claim 2, wherein said door has a texture that generally corresponds with brick or stone.

6. The enclosure of claim 2, wherein said door is operatively interconnected to a lower portion of said lip.

7. The enclosure of claim 1, further comprising a rod positioned within the control tube, the rod operatively associated with a stem screw positioned within said first aperture and protruding through said plate, the rod having a distal end with a plunger that is adapted to selectively open and close said valve when said rod is moved from a first position to a second position when said stem screw is rotated.

8. The enclosure of claim wherein said second aperture is associated with a backflow preventer positioned within said recess, wherein when said valve is open water is expelled through said backflow preventer.

9. An enclosure with integral hydrant, comprising:
a plate having a first surface and a second surface;
a lip integrated to and extending from said first surface;
a recess integrated into said plate and extending from said plate, said recess defining a protrusion extending from said plate, said protrusion having a surface spaced from and generally parallel with said plate;
a boss spaced from said protrusion and extending from said plate, said boss having an aperture associated with a control tube;
a fluid opening associated with said recess;
a fluid supply tube interconnected to said surface of said protrusion and associated with said fluid opening; and
wherein said plate, said lip, said protrusion, and said boss form a monolithic structure.

10. The enclosure of claim 9, further comprising a hinge plate interconnected to at least one of said lip and said plate, and a door operatively interconnected to said hinge plate.

11. The enclosure of claim 10, wherein said hinge plate includes at least one protrusion that receives a fastener that interconnects said hinge plate to said plate.

12. The enclosure of claim 10, wherein said door includes a lock.

13. The enclosure of claim 10, wherein said door has a texture that generally corresponds with brick or stone.

14. The enclosure of claim 10, wherein said door is operatively interconnected to a lower portion of said lip.

15. An enclosure with integral hydrant, comprising:
a plate having a first surface and a second surface;
a door operatively interconnected to said plate and configured to assuming a closed configuration wherein said first surface is concealed;
a lip extending from at least one of said plate and said door;
a recess integrated into said plate and extending from said first surface to said second surface, said recess defining a protrusion extending from said second surface, said protrusion having a third surface spaced from and generally parallel with said second surface;
a first aperture through said plate and spaced from said recess;
a second aperture through said third surface, said second aperture being a fluid outlet;
a first boss associated with said first aperture and extending from said second surface;
a second boss associated with said second aperture and extending from said third surface, said first boss spaced from said second boss;
a fluid conduit connecting said second boss to said recess; and
wherein said plate, said protrusion, said first boss, said second boss, and said fluid conduit comprise a monolithic structure;
a control tube having a proximal end interconnected to said first boss;
a fluid supply tube having a proximal end interconnected to said second boss;
a valve with a fluid supply inlet, a first outlet interconnected to a distal end of said fluid supply tube, and a second outlet interconnected to a distal end of said control tube.

16. The enclosure of claim 15, wherein said door includes a lock.

17. The enclosure of claim 15, further comprising a rod positioned within the control tube, the rod operatively associated with a stem screw positioned within said first aperture and protruding through said plate, the rod having a distal end with a plunger that is adapted to selectively open and close said valve when said rod is moved from a first position to a second position when said stem screw is rotated.

18. The enclosure of claim 15, wherein said second aperture is associated with a backflow preventer positioned within said recess, wherein when said valve is open water is expelled through said backflow preventer.

* * * * *